United States Patent
Seixas et al.

(10) Patent No.: US 6,533,032 B1
(45) Date of Patent: Mar. 18, 2003

(54) SUBSEA PIG LAUNCHER AND METHOD OF USING THE SAME

(75) Inventors: Ricardo Moreira Seixas, Rio de Janeiro (BR); Bruno Schauerte, Rio de Janeiro (BR)

(73) Assignee: ABB Vetco Gray Inc., Houston, TX (US)

( * ) Notice: Subject to any disclaimer, the term of this patent is extended or adjusted under 35 U.S.C. 154(b) by 0 days.

(21) Appl. No.: 09/694,249

(22) Filed: Oct. 23, 2000

Related U.S. Application Data
(60) Provisional application No. 60/162,165, filed on Oct. 28, 1999.

(51) Int. Cl.[7] .................................................. B08B 9/04
(52) U.S. Cl. ........................ 166/70; 134/8; 134/22.11; 15/104.062
(58) Field of Search ........................ 166/70, 383; 134/8, 134/22.11, 22.12, 22.18; 15/104.05, 104.062, 104.061

(56) References Cited

U.S. PATENT DOCUMENTS

| | | | |
|---|---|---|---|
| 2,713,909 A | * 7/1955 | Baker | 166/70 |
| 3,396,789 A | 8/1968 | Dean | |
| 3,545,474 A | * 12/1970 | Brown | 166/70 X |
| 4,210,208 A | * 7/1980 | Shanks | 166/352 |
| 4,260,022 A | 4/1981 | Van Bilderbeek | |
| 5,437,302 A | 8/1995 | Da Silva et al. | |
| 5,884,656 A | 3/1999 | Smith | |
| 6,022,421 A | 2/2000 | Bath et al. | |
| 6,039,122 A | * 3/2000 | Gonzalez | 166/70 X |

* cited by examiner

*Primary Examiner*—David Bagnell
*Assistant Examiner*—Sunil Singh
(74) *Attorney, Agent, or Firm*—Bracewell & Patterson, L.L.P.

(57) ABSTRACT

A device and method are provided for storing pipeline pigs and launching the pigs into a subsea production pipeline. The device is installed in line with a pipeline and includes a frame, a magazine containing several rotatable trays for storing and sequentially launching the pigs, and a connector for directing the pigs into a pipeline. Each magazine tray holds several pigs and rotates to align the pigs with a launching tube. The pigs travel through the launch tube and connector and into the pipeline.

23 Claims, 7 Drawing Sheets

SUBSEA PIG LAUNCHER AND METHOD OF USING THE SAME

This application claims benefit of Ser. No. 60/162,165 filed Oct. 28, 1999.

BACKGROUND OF THE INVENTION

1. Field of the Invention

The present invention relates generally to pipeline-pig launchers and relates specifically to a launcher used at a subsea location and having a magazine holding a plurality of pigs for launch.

2. Description of the Prior Art

Oil and gas flowing through a production pipeline can deposit paraffin and other substances on the inner wall of the pipeline. To prevent blockage, producers send pipeline pigs through the pipeline to scrape the walls and remove the deposits.

Several pig launchers having storage and launching capabilities are found in the prior art. The device disclosed in U.S. Pat. No. 3,396,789 has a rotatable tool holder that is journaled within a case. The tool holder has a plurality of tubes that can be aligned with the flowline. There is no provision for releasing individual tools from each tube, and if more than one tool is in a given tube, they will all be released when aligned with the flowline.

The pig launcher of U.S. Pat. No. 5,884,656 includes a single tube containing multiple pigs and has the ability to launch only one pig at a time.

A stabbing configuration and magazine are found in the pig launcher disclosed in U.S. Pat. No. 6,022,421. The pig launcher is landed on a frame having a connector for introducing the pigs into a production pipeline. The launcher has a single tube magazine and can launch single pigs.

SUMMARY OF THE INVENTION

A pig launcher is provided for use in a subsea location. The launcher has a frame for landing on the sea floor and a magazine for storing and controllably releasing a set of pigs. A drive assembly sequentially releases the pigs, and a set of interconnects releasably connects the pig launcher to a production flowline. An umbilical stab releasably received in a receptacle in the frame is used to control the operation of the drive assembly and receives power from . An umbilical line runs from the stab to a surface platform to supply a source of power for operational control.

Additional objects, features, and advantages will be apparent in the written description that follows.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

FIGS. 1 through 9 show the preferred embodiment of a subsea pig launcher 10 of the invention.

Figure 1:
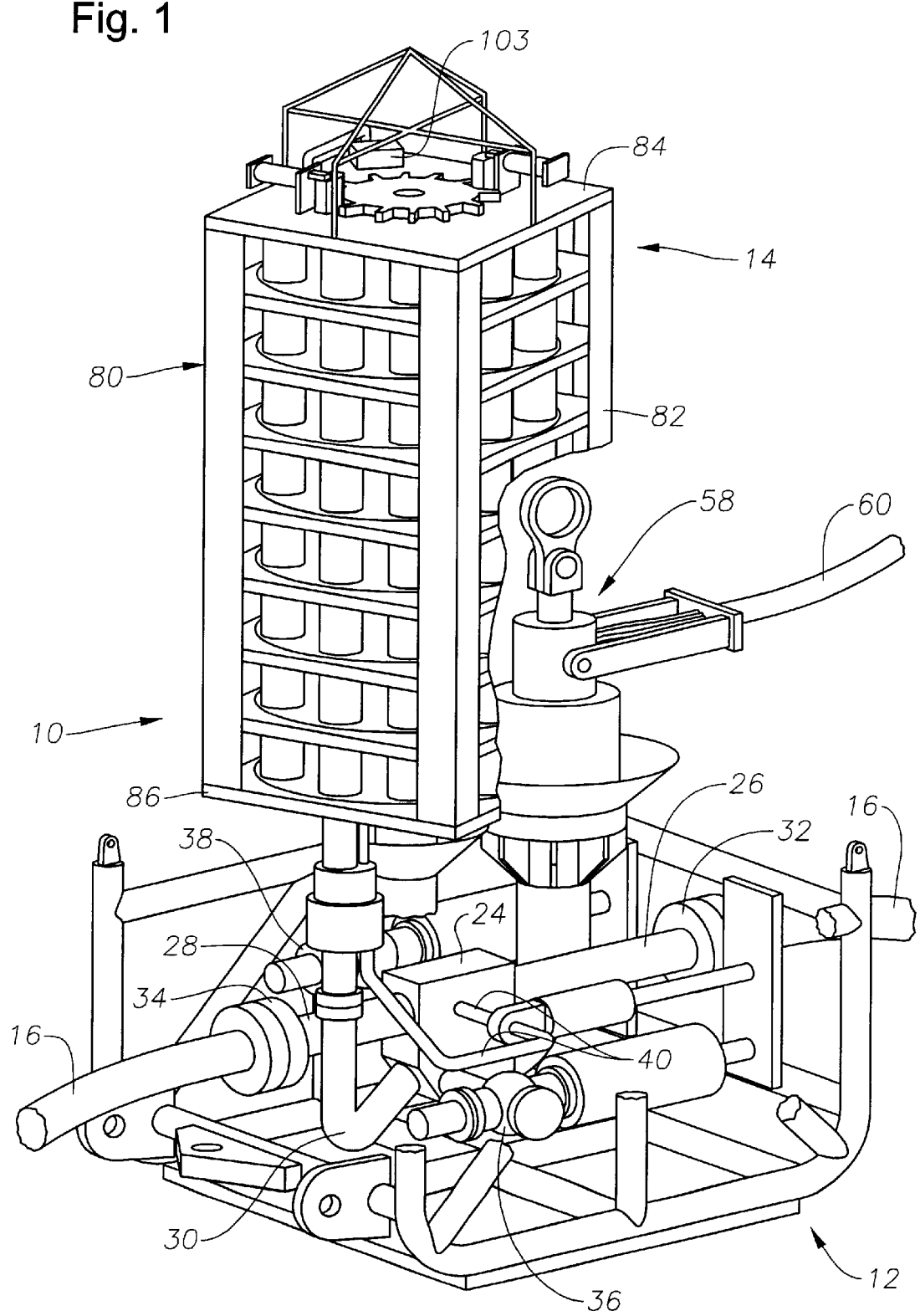
FIG. 1 is a perspective view of a subsea pig launcher constructed in accordance with this invention.

Referring first to FIG. 1, a subsea pig launcher 10 constructed in accordance with this invention generally comprises a tie-in frame 12 and a pig launching magazine 14. Frame 12 is interconnected between pipeline or flowline 16, and magazine 14 is landed on frame 12.

Figure 2:
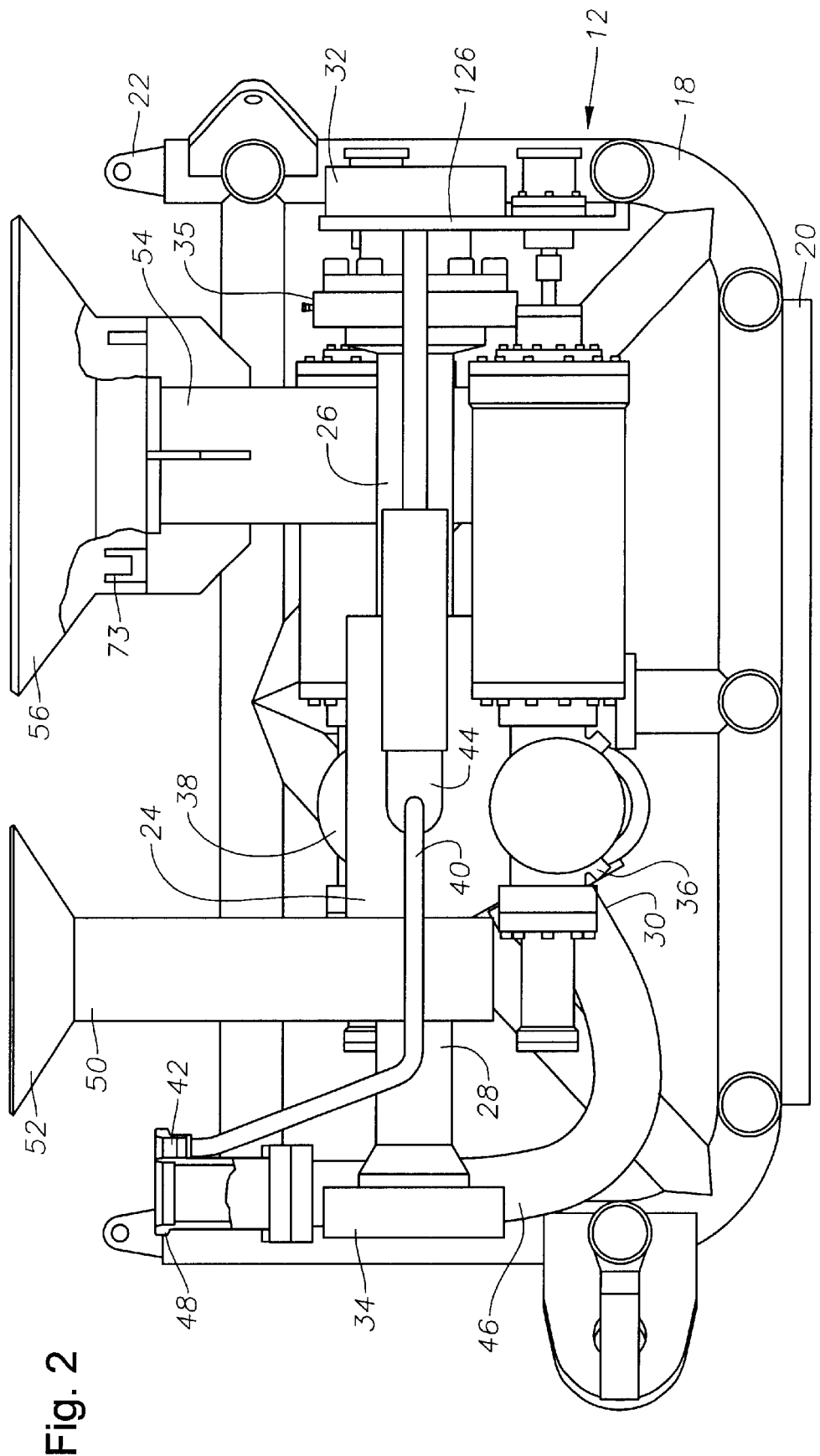
FIG. 2 is a side view of the frame of a subsea pig launcher constructed in accordance with this invention.
Figure 3:
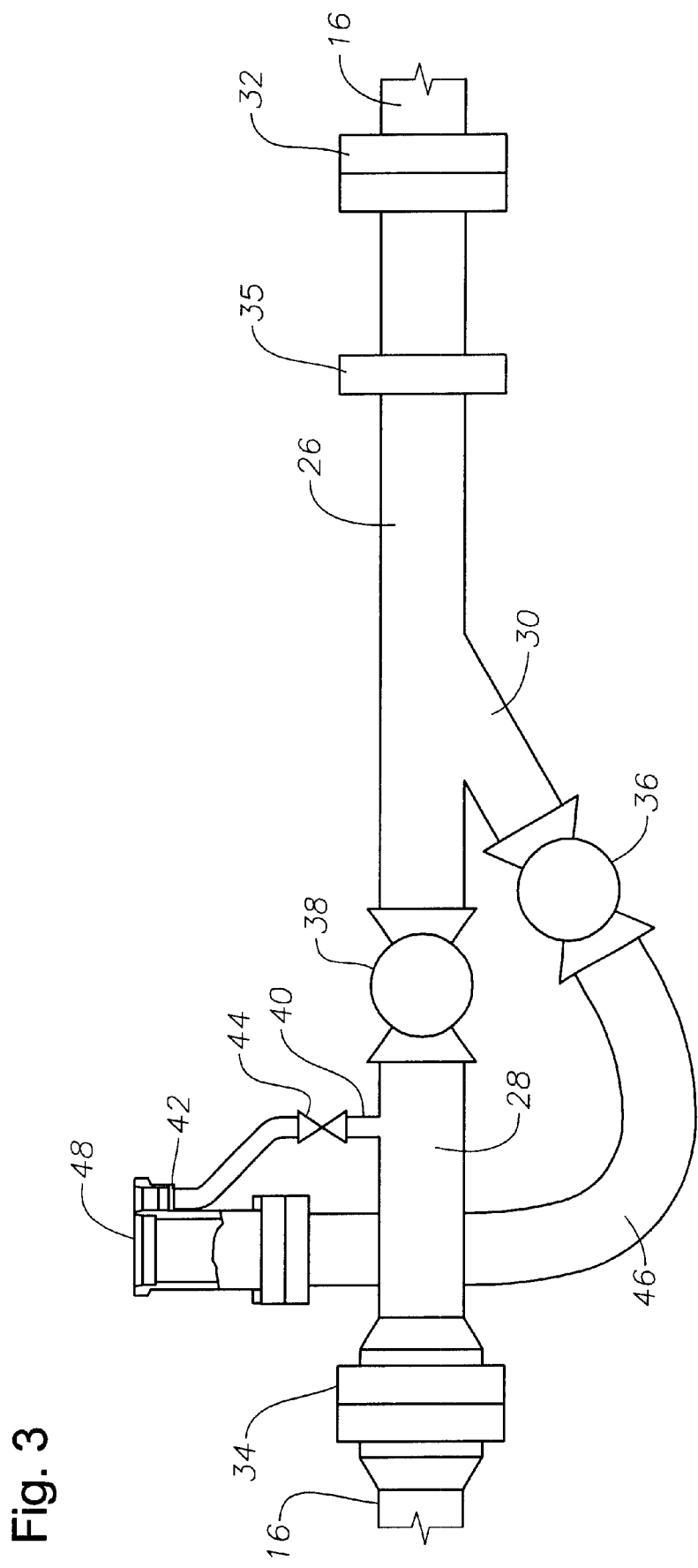
FIG. 3 is a piping schematic of the frame in FIG. 2.

Referring now to FIG. 2, tie-in frame 12 generally has a guard structure 18 defining its perimeter. Guard structure 18 has a solid base 20 which prevents structure 18 from sinking through mud on the sea floor, and a plurality of lifting points 22 are positioned on its upper end. An asymmetric wye 24 with an exit 26, an in-line leg 28, and a launching tube or branch leg 30 are protected within structure 18. In-line leg 28 is aligned with exit 26 and runs generally parallel to base 20. As shown in FIG. 3, branch leg 30 intersects in-line leg 26 at an acute angle and extends generally downward from in-line leg 26. Exit 26 terminates in a exit flange 32 at one end of structure 18 and in-line leg 28 terminates in an inlet flange 34 at the other end. Exit line 26, in-line leg 28, and branch leg 30 are substantially the same diameter as flowline 16. An electronic pig detector 35 is mounted to detect pigs passing through exit 26. Launching tube 30 has a remotely actuated, ball-type bypass valve 36. In-line leg 26 has a remotely actuated, ball-type production valve 38. A smaller feed line 40 is positioned between valve 38 and inlet flange 34 (FIG. 3) and extends upward from in-line leg 26 terminating in an upwardly facing feed line connector 42. A remotely actuated, gate-type launching valve 44 is positioned in feed line 40. A pig line 46 extends from launching tube 30, curving to run directly upward and terminates in an upwardly facing pig line connector hub 48. Hub 48 integrally accepts feed line connector 42.

Figure 4:
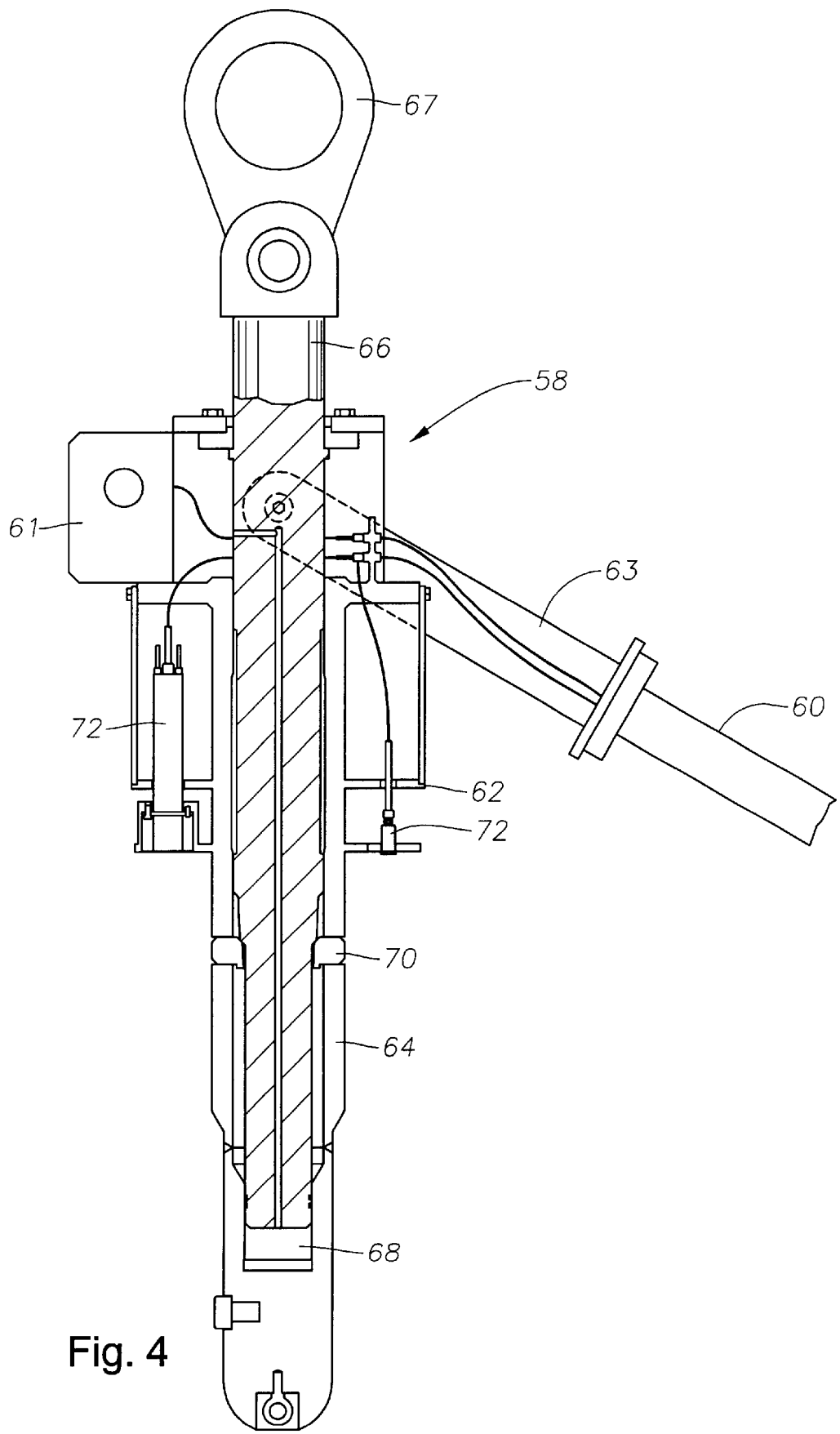
FIG. 4 is a side sectional view of an umbilical stab for a subsea pig launcher constructed in accordance with this invention.

Referring again to FIG. 2, an upwardly facing magazine receptacle 50 is mounted on frame 12. Magazine receptacle 50 is a tube aligned vertically and having a conical guide funnel 52 at its upper end. A similarly shaped umbilical receptacle 54 is mounted on frame 12, the receptacle being aligned vertically and having a guide funnel 56 at its upper end. FIG. 4 shows an umbilical stab 58 adapted to land in umbilical receptacle 54 and that has electric and hydraulic circuits (not shown) which are remotely actuated through an umbilical line 60 to the surface. Umbilical stab 58 has a body portion 62 with a stab portion 64 extending therefrom. Stab portion 64 is cylindrical and sized to be closely accepted in receptacle 54. Umbilical 60 is supported relative to body portion 62 by a hinged harness 63 mounted to hinge about a horizontal axis. A support portion 66 sealingly extends into a cavity 68 of stab portion 64 and has a lifting ring 67 on its upper end. Lifting ring 67 is mounted to support portion 66 to rotate about a horizontal axis. Hydraulic fluid from line 60 or from a stab panel 61 as known in the art can be pumped into a cavity 68 to raise or lower body portion 62 relative to stab portion 64. This activates a lock 70 which is adapted to engage a corresponding notch (not shown) in receptacle 54 and lock stab 58 to receptacle 54 when support portion 66 is in a lower position. Above stab portion 64, body portion 62 carries a plurality of downward facing electric and hydraulic connectors 72. Connectors 72 are positioned to mate with upward facing electric and hydraulic interconnects 73 (FIG. 2) on receptacle 54. Interconnects 73 connect the electric and hydraulic circuits of umbilical stab 58 to a circuit on frame 12 discussed in further detail below.

Figure 5:
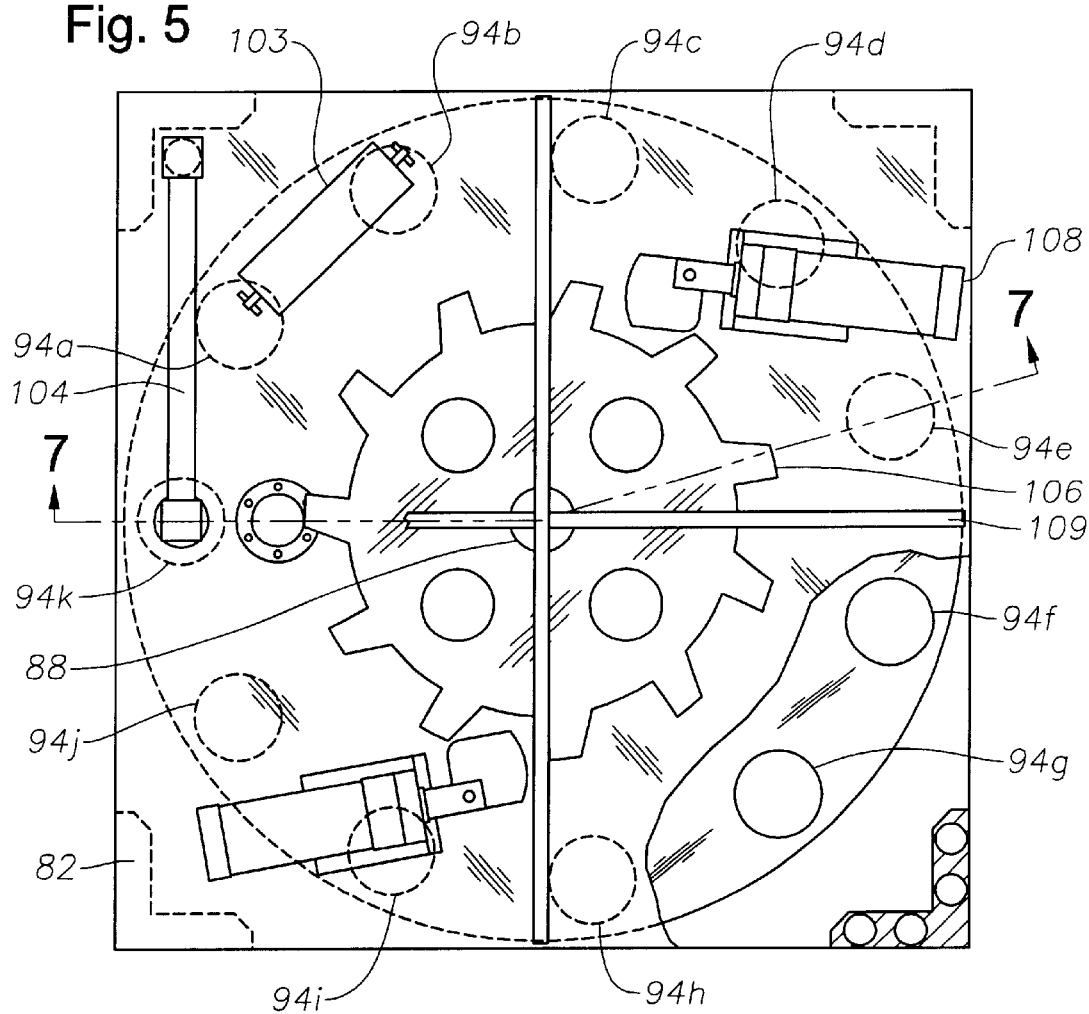
FIG. 5 is a top view of a pig magazine of a subsea pig launcher constructed in accordance with this invention.
Figure 7:
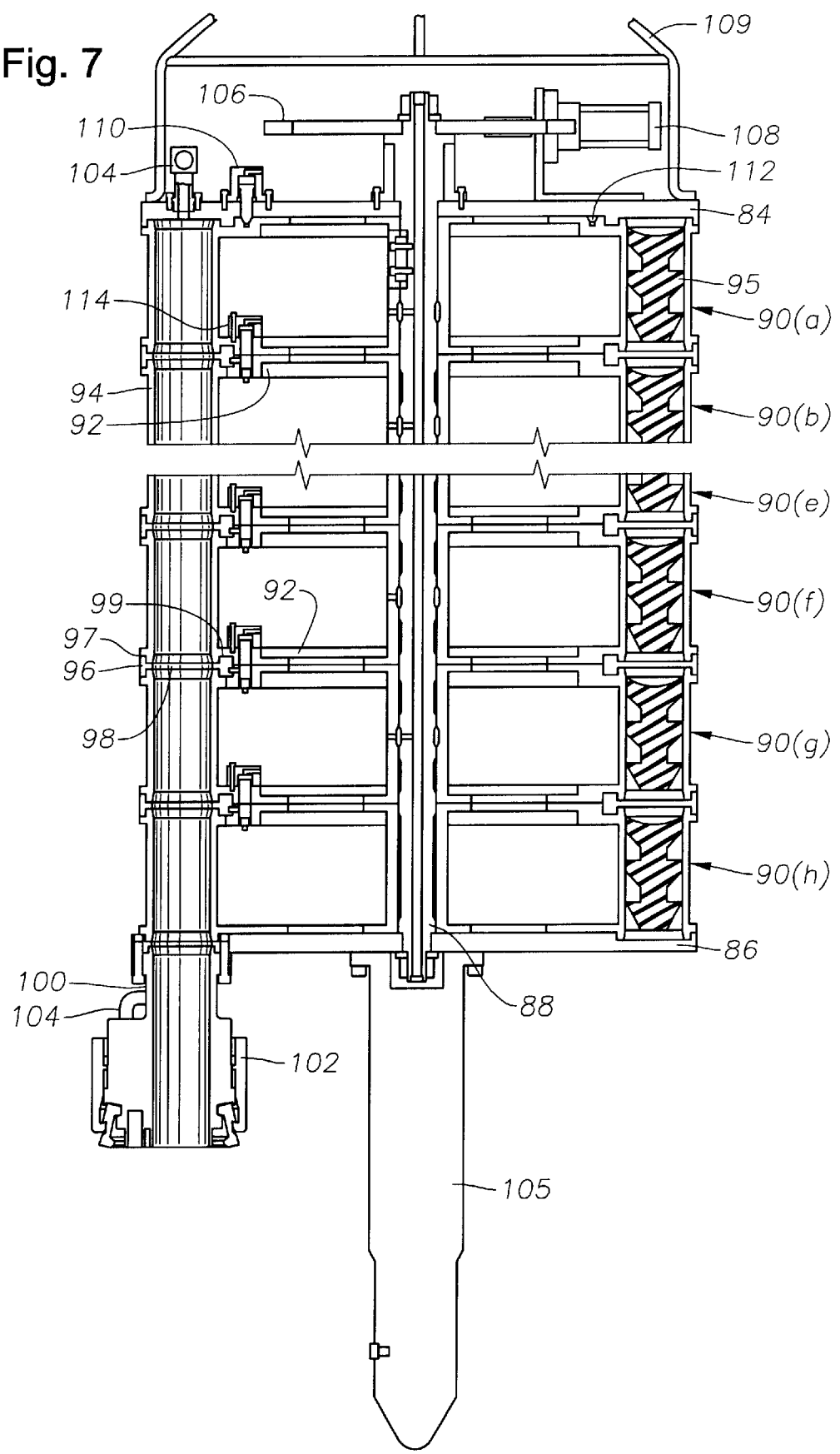
FIG. 7 is a sectional view of the pig magazine of FIG. 5 taken along section line 7—7.

Referring again to FIG. 1, pig launching magazine 14 generally comprises a frame 80 having four corner struts 82, an upper end plate 84, and a lower end plate 86. As seen in FIG. 7, a central shaft 88 spans end plates 84, 86 and carries a plurality of launching trays 90. The embodiment depicted in FIG. 7 has eight trays 90(*a*)–90(*h*) The first tray 90(*a*) is rigidly fixed to shaft 88 and the remaining trays 90(*b*)–90(*h*) can freely rotate about shaft 88. Each tray 90 has end plates 92 which sandwich a plurality of staging chambers 94 but leave the ends of chambers 94 open. Staging chambers 94 are sized to accept a suitable pipeline pig 95 for pipeline 16 and are arrayed on launching trays 90. Referring to FIG. 5, each tray 90 has eleven staging chambers 94(*a*)–94(*k*); ten to be loaded pigs 95 (FIG. 7) and one for launching. The number of trays 90 and chambers 94 per tray depends on how many pigs 95 are desired to be carried in magazine 14 and related space constraints. Other numerical combinations of trays 90 and chambers 94 per are within the scope of this invention.

Figure 6:
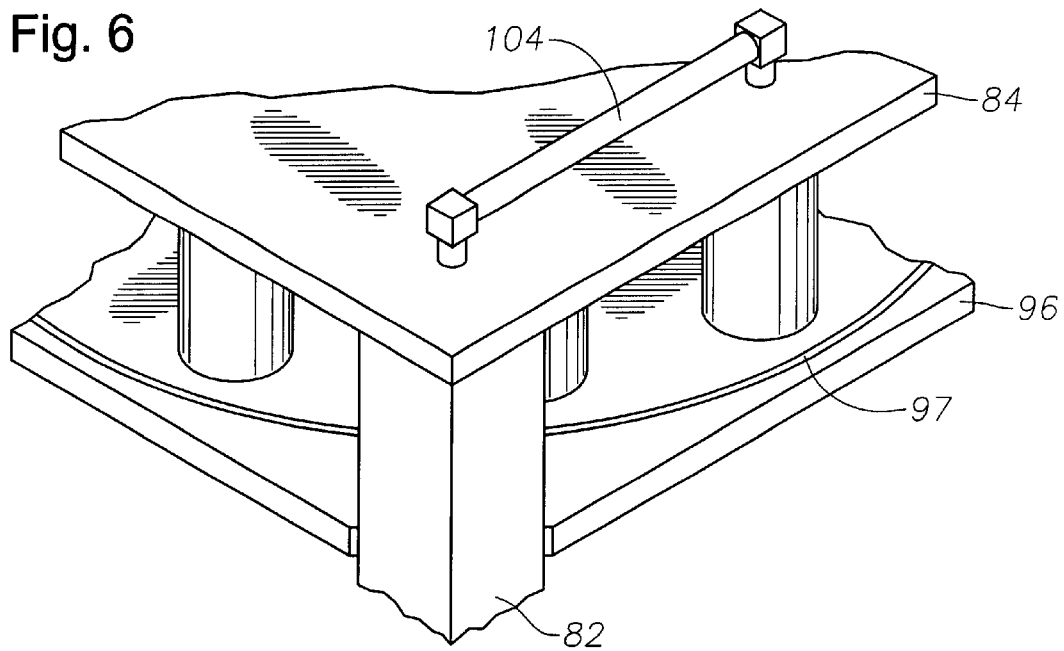
FIG. 6 is a detail view of a portion, of the pig magazine of FIG. 5.

Referring again to FIG. 7, tray separators 96 are spaced between launching trays 90(*b*)–(*h*) and stationarily secured to corner struts 82 (FIG. 6). Each has a circular inner hole which allows a portion of vertically adjacent trays 90 to abut. Tray 90(*a*) abuts upper end plate 84, and tray 90(*h*) abuts lower end plate 86. Each tray separator 96 and lower end plate 86 have a single circular pass-through 98 adapted to seal the perimeter of a pig tube 94 and allow passage of a pipeline pig from a higher positioned pig tube 94 to a lower positioned pig tube 94, and in the case of the lower end plate 76, into a pig tube stub 100. Also, tray separators 96 have circular outer guard edges 97, positioned along the circumference of launching trays 90 to tangentially abut vertically adjacent staging chambers 94 and guard against entrance of contaminants into magazine 14 and staging chambers 94. Circular inner guard edges 99 are positioned concentrically inward of outer guards 97 to tangentially abut an inner edge of staging chambers 94 and further guard against entrance of contaminants into staging chambers 94.

A pig tube stub 100 is joined to lower end plate 86 and extends downward. Stub 100 has a pig line connector 102 at its end adapted to connect and seal with connector hub 48. Pig line connector 102 is preferably a collet connector known to those skilled in the art which can be actuated remotely by hydraulics. In addition to the pig tube stub 100 for passage of a pipeline pig, connector 102 has separate passages for the flow from feed line 40 to an upper feed line 104 and for connecting a circuit on frame 12 to a control module 103 on magazine 14 (FIG. 5). Upper feed line 104 runs out of connector 102 and into upper end plate 84 (FIG. 6) axially aligned above stub 100, allowing fluid from feed line 40 to flow into a column of staging chambers 94 and back out stub 100. A cylindrical magazine stab 105 extends downward from-magazine 14 and is adapted to be closely accepted in receptacle 50.

A drive assembly is shown in FIG. 5. A toothed drive disk 106 is joined to the top of shaft 88 above upper plate 84. At least one hydraulic actuator 108 is mounted on upper plate 84 to engage drive disk 106 and rotate shaft 86 and the upper most launching tray 90(*a*). Drive disk 106 is configured such that one outward stroke of actuator 108 rotates upper plate 84 approximately the same angular distance as between staging chambers 94, thus moving one pig tube 94 generally into the same position as its adjacent pig tube 94. A protective cage 109 is positioned on plate 84 to protect drive disk 106 and actuator 108.

Figure 8:
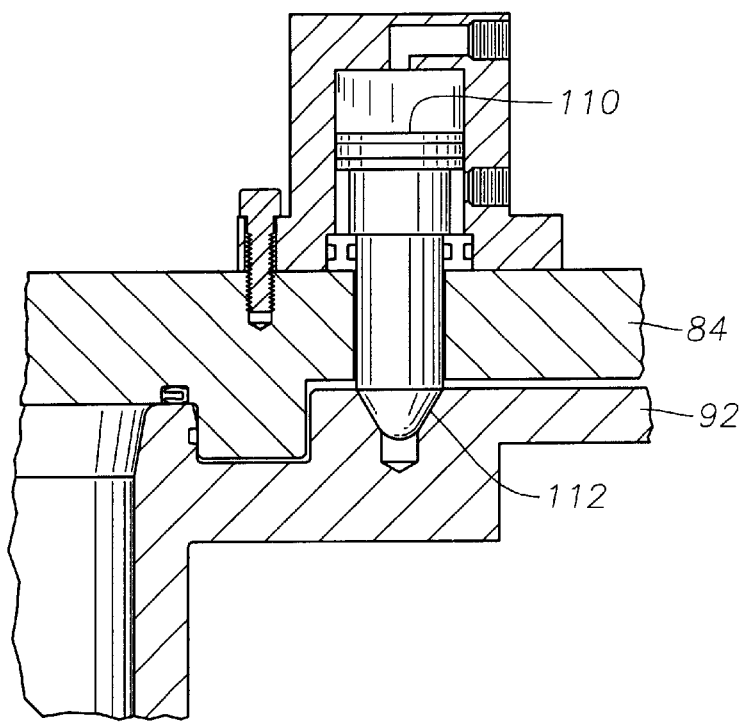
FIG. 8 is a detail view of the locking pin of FIG. 7.
Figure 9:
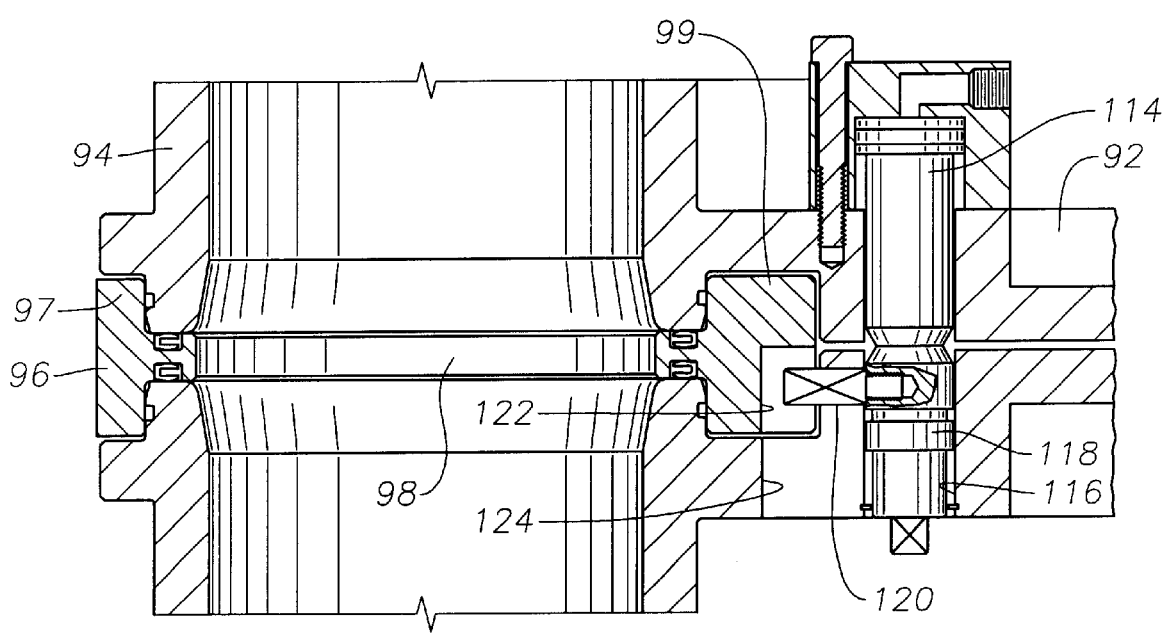
FIG. 9 is a detail view of the engaging pin of FIG. 7.

An indexing mechanism is seen in FIGS. 7 through 9. Referring to FIG. 8, a hydraulically actuated lock pin 110 is joined to upper plate 84 and can be hydraulically extended into or retracted out one of a plurality of pin receptacles 112 in end plate 92 of upper most launching tray 90(*a*). Each pin receptacle 112 corresponds to a pig tube 94 and is positioned such that when pin 110 is extended into a pin receptacle 112, it locks the corresponding pig tube 94 in alignment with stub 100 to prevent rotation of launching tray 90(*a*). Receptacle 112 is shaped as a female cone and pin 110 is shaped as a male cone to compensate for small misalignment of pin 110 and receptacle 112.

Referring to FIG. 9, launching trays 90 have a hydraulically actuated engaging pin 114 that functions like locking pin 110 and is hydraulically extendable into and retractable out of a tray pin receptacle 116 in the adjacent launching tray 90. For simplicity of discussion, trays 90(*a*) and 90(*b*) are described, but all trays except lower tray 90(*h*) have an engaging pin 114, and all except upper tray 90(*a*) have a tray pin receptacle 116. Pin receptacle 116 has a release piston 118 reciprocatingly retained therein and biased in an upward position. Release piston 118 has an engagement stub 120 which extends outward through a notch 122 in tray 90(*b*), and when piston 118 is in an upper position, into a notch 124 in the corresponding separator plate 96 adjacent to passthrough 98. With engagement stub 120 in, notch 124, pass-through 98 is aligned with the upper end of pig tube 94 on tray 90 (*b*). Also, tray 90(*b*) is locked to separator plate 96 and cannot rotate. As engaging pin 114 is extended into receptacle 116, it displaces piston 118 and moves stub 120 out of notch 124 in separator 96. With stub 120 out of notch 124 and pin 114 in receptacle 116, tray 90(*b*) is locked to tray 90(*a*), and they will rotate in unison.

Referring generally to FIG. 1, an electric and hydraulic feed from line 60 is connected to a hydraulic circuit on frame 12 through connectors 72 on umbilical stab 58. This supplies electricity and hydraulic pressure to operate a control module 103 on magazine 14. Control module 103 is configured to detect pig passage with pig detector 35, open and close valves 36, 38, and 44, and actuate hydraulic actuator 108 and pins 110 and 114. A stab panel 126 positioned on frame 12 (FIG. 2) allows electric and hydraulic input from an ROV as an alternative to stab 58.

In operation, frame 12 is lowered to the sea floor and connected into pipeline 16 such that fluid flowing in pipeline 16 can flow directly through in-line leg 28 and out exit 26 (FIG. 1). Pig launching magazine 14 is loaded with pipeline pigs 95 (FIG. 7) leaving one pig tube, preferably 94(*k*), of each tray 90 empty. Magazine 14 is then lowered onto frame 12 with stab 105 being received in receptacle 50. Stab 105 supports magazine 14 to stand vertically, and pig line connector 102 is aligned with connector hub 48 and actuated to join and seal with connector hub 48. Cavity 68 of umbilical stab 58 (FIG. 4) is pressurized with hydraulic fluid from line 60 to maintain support portion 66 in a raised upper position. Umbilical stab 58 is then lowered from the surface onto frame 12 with stab portion 64 in receptacle 54 supporting body portion 62 above receptacle 54. Pressure is released from cavity 68, body portion 62 slowly moves to a lower position and support portion 66 activates lock 70, thus locking umbilical stab 58 to frame 12.

Hydraulic pressure and electric signals are sent through line 60 and umbilical stab 58 and through hub 48 and connector 102 into control module 103 to operate module 103. Alternately, signals can be sent-from the ROV panel 126. Module 103 extends hydraulic actuators 108. Actuators 108 engage the teeth of drive disk 106 and rotate shaft 88 such that the pig tube 94 adjacent to the empty tube 94, here pig tube 94(*a*), of launching tray 90(*a*) is generally aligned with tube stub 100 and over empty staging chambers 94(*k*) of trays 90(*b*)–90(*h*) (FIG. 7). Module 103 also actuates locking pin 110. When the pin receptacle 112 corresponding to tube 94(*a*) passes under pin 110, pin 110 is forced into receptacle 112 locking tube 94(*a*) of tray 90(*a*) over empty chambers 94(*k*) of trays 90(*b*)–(*h*). Also, pin 110 in receptacle 112 ensures fine alignment of tube 94(*a*) of tray 90(*a*) with tube stub 100 and empty staging chambers 94(*k*) of trays 90(*b*)–90(*h*). Pig 95 in tube 94(*a*) is now in position to launch.

With pig 95 in position, module 103 opens feed line valve 44 allowing fluid from flowline 16 to flow up through feed line 40, through upper feed line 104, and into staging chambers 94 pressurizing behind pig 95. Bypass valve 36 is then opened by module 103 and the fluid pressure pushes pig 95 into flowline 16. As pig 95 passes pig detector 35, module 103 is signaled to first close valve 36, then valve 44. The next pig tube 94(*b*) is rotated into position as described above and its pig 95 is released. The above procedure is repeated until all pigs 95 in tray 90(*a*) have been released.

Next, module 103 actuates engagement pin 114 in tray 90(*a*) to force it into the pin receptacle of tray 90(*b*). This displaces release piston 118 of tray 90(*b*) and locks tray 90(*a*) and tray 90(*b*) to rotate together. As piston 118 is displaced, engagement stub 120 is moved out of notch 124 in the separator plate 96, unlocking tray 90(*b*) from its corresponding separator plate 96. Module 103 extends hydraulic actuators 108, thus rotating shaft 88, tray 90(*a*), and tray 90(*b*) to generally align pig tube 94(*a*) of tray 90(*b*) containing a pig 95 into alignment with empty chambers 94(*k*) of trays 90(*c*)–(*h*) and pig stub 100. Pin 110 is actuated to extend into the corresponding receptacle 112 to align and lock tube 94(*a*) of tray 90(*b*) and a tube 94 of tray 90(*a*) in position. As above, module 103 opens feed line valve 44, pressurizing behind pig 95, then opens bypass valve 36 to pass pig 95 into flowline 16. As pig 95 passes detector 35, module 103 closes valve 36 and valve 44.

These steps are repeated with each level of trays 90(*c*)–90(*h*) until all of pigs 95 have been released. Magazine 14 can then be retrieved to the surface after releasing connector 102. On the surface magazine 14 can be re-loaded with pig 95 for future pigging.

While the invention is shown in only one of its forms, it should be apparent to those skilled in the art that it is not so limited, but is susceptible to various changes without departing from the scope of the invention.

What is claimed is:

1. A pig launcher for use in a subsea location comprising:
  a frame for coupling to a subsea production-flowline;
  a pig-launching magazine carried on the frame for storing and controllably releasing a set of pigs;
  a drive assembly operably connected with the magazine for sequentially releasing the pigs; and
  an umbilical line having a stab releasably received in a receptacle in the frame and adapted to run from the stab back to a surface platform to supply a source of power for operating the drive assembly.

2. The pig launcher of claim 1, further comprising:
  a pig line adapted to be attached to the production flowline and curving to run upward, the pig line ending in an upwardly facing pig-line connector hub, the magazine being carried on the connector hub to release pigs into the pig line; and
  a feed line adapted to carry pressure from the production flowline, the feed line having a launching valve and ending in a feed line connector integrally carried in the connector hub to supply pressure for injecting pigs into the pig line.

3. The pig launcher of claim 1 wherein:
  the stab comprises a body portion having electric and hydraulic connectors.

4. The pig launcher of claim 1, wherein the magazine further comprises:
  a set of launching trays, each tray having an array of staging chambers that are alignable with staging chambers of adjacent trays;
  a pig line adapted to lead to the production flowline, each of the staging chambers being indexable into alignment with the pig line to launch a pig from each of the staging chambers;
  an indexing mechanism coupled to a shaft and the trays, the mechanism selectively causing the trays to rotate each staging chamber into alignment with the pig line; and
  a drive assembly for selectively rotating the shaft to rotate the trays.

5. The pig launcher of claim 1, wherein the magazine further comprises:
  a rotatable central shaft;
  a set of launching trays, each tray having an array of staging chambers that are alignable with staging chambers of adjacent trays, the shaft being located at the center of each tray;
  a pig line connector hub adapted to lead to the production flowline, each of the staging chambers being indexable into alignment with the pig line connector hub to launch a pig from each of the staging chambers;
  an indexing mechanism coupled to the shaft and the trays and that selectively causes the trays to rotate each staging chamber into alignment with the pig line connector hub; and
  a drive assembly for selectively rotating the shaft to rotate the trays.

6. A pig launcher for use in a subsea location comprising:
  a frame for coupling to a subsea production flowline;
  a pig-launching magazine that is retrievable from the frame and adapted to hold a plurality of pigs, the magazine having a stab for landing in a receptacle on the frame;
  a drive assembly for sequentially releasing the pigs from the magazine; and
  an umbilical line to supply an external source of power for operating the drive assembly.

7. The pig launcher of claim 6, wherein:
  the magazine has a plurality of trays, each tray having a plurality of staging chambers for holding the pigs.

8. The pig launcher of claim 6, wherein:
  the magazine has a plurality of trays, each tray having a plurality of staging chambers in an array for holding a plurality of pigs; and
  the drive assembly comprises an indexer for moving each tray sequentially to align each chamber with a launching tube, the launching tube adapted to lead to the production flowline.

9. The pig launcher of claim 6, wherein the umbilical line has a stab that is releasably received in a receptacle in the frame.

10. The pig launcher of claim 6, wherein the magazine comprises:
   a first tray having a plurality of staging chambers in a circular pattern, each of the chambers for holding a pig; and
   a second tray adjacent to the first tray, the second tray having a plurality of staging chambers in a circular pattern, each of the chambers of the second tray for holding a pig.

11. A pig launcher for use in a subsea location comprising:
   a frame for coupling to a subsea production flowline;
   a launching tube adapted to be connected to the subsea flowline;
   a pig-launching magazine that is retrievable from the frame and adapted to hold a plurality of pigs, the magazine having a stab for landing in a receptacle on the frame, the magazine also being connected to the launching tube;
   an umbilical line having a stab releasably received in a receptacle in the frame and adapted to run from the stab back to a surface platform to supply a source of power for operating the drive assembly;
   a first tray having a plurality of staging chambers in a circular pattern, each of the staging chambers for holding a pig;
   a second tray adjacent to the first tray, the second tray having a plurality of staging chambers in a circular pattern, each of the staging chambers of the second tray for holding a pig;
   a rotatably-driven shaft extending through the trays, the first tray being secured to the shaft for rotation to sequentially align each of the chambers of the first tray with the launching tube while the second tray remains stationary; and
   an indexer that selectively locks the second tray for rotation with the first tray after the first tray is empty of pigs, to dispense the pigs from the second tray into the launching tube.

12. The pig launcher of claim 11, wherein:
   the pigs of the first tray move through an empty chamber provided in the second tray to reach the launching tube.

13. The pig launcher of claim 11, wherein:
   the trays are arranged in a vertical stack.

14. The pig launcher of claim 11, further comprising:
   a pig line adapted to be attached to the launching tube and extending upward, the pig line ending in an upwardly facing pig-line connector hub, the magazine being carried on the connector hub to release pigs into the pig line; and
   a feed line adapted to carry pressure from the production flowline, the feed line having a launching valve and ending in a feed line connector carried in the connector hub to supply pressure for injecting pigs into the pig line.

15. A method of storing and launching pigs in a subsea location comprising:
   (a) connecting a launching tube of a frame into a subsea production flowline, the frame into a subsea production flowline, the frame having a magazine receptacle and an umbilical receptacle;
   (b) landing an umbilical line in the umbilical receptacle;
   (c) loading a plurality of pigs into a magazine at the surface platform and lowering the magazine into the magazine receptacle on the frame; and
   (d) supplying power through the umbilical line to index the magazine to sequentially align the pigs in the magazine with the launching tube.

16. The method of claim 15, wherein:
   step (a) further comprises connecting a feed line between the production flowline and the magazine; and
   step (d) further comprises applying pressure from the flowline through the feed line upstream of the pigs contained within the magazine to launch each pig.

17. The method of claim 15, wherein: step (d) further comprises selectively rotating trays of the magazine so that pig-containing chambers of the trays sequentially align with the launching-tube.

18. A method of storing and launching pigs in a subsea location comprising:
   (a) connecting a launching tube of a frame into a subsea production flowline;
   (b) providing a magazine with a first tray and an adjacent second tray, each tray having a plurality of staging chambers in a circular pattern;
   (c) loading pigs into the staging chambers;
   (d) incrementally rotating the first tray to sequentially align each of the chambers of the first tray with the launching tube while the second tray remains stationary; then
   (e) incrementally rotating the second tray after the first tray is empty of pigs and sequentially aligning each of the chambers of the second tray with the launching tube to dispense the pigs from the second tray into the launching tube.

19. The method of claim 18, wherein:
   step (d) further comprises the pigs of the first tray passing through a chamber of the second tray when moving toward the launching tube.

20. The method of claim 18, further comprising:
   controlling a launching valve to release pressure from the production flowline through a feed line to force the pigs from the trays into the launching tube for injection into the flowline.

21. The method of claim 18, wherein:
   step (e) further comprises incrementally rotating both of the trays in unison.

22. A pig launcher for use in a subsea location comprising:
   a) a frame for coupling to a subsea production flowline;
   b) a pig-launching magazine carried on the frame for storing and controllably releasing a set of pigs, the magazine comprising:
      1) a rotatable central shaft;
      2) a first tray having a plurality of staging chambers in a circular pattern, each of the staging chambers for holding a pig;
      3) a second tray adjacent to the first tray, the second tray having a plurality of staging chambers in a circular pattern, each of the staging chambers of the second tray for holding a pig;
      4) a pig line connector hub adapted to lead to the production flowline, each of the staging chambers being indexable into alignment with the pig line connector hub to launch a pig from each of the staging chambers;
      5) a drive assembly for selectively rotating the shaft to rotate the trays;

6) an indexing mechanism coupled to the trays, the mechanism selectively causing the chambers of the first tray to sequentially rotate into alignment with the pig line connector hub until the first tray is empty of pigs, the mechanism selectively locking the second tray for rotation with the first tray after the first tray is empty of pigs to dispense the pigs from the chambers of the second tray into the connector hub until the second tray is empty;

c) a drive assembly operably connecting with the magazine for selectively releasing the pigs; and d) an umbilical line having a stab releasably received in a receptacle in the frame and adapted to run from the stab back to a surface platform to supply a source of power for operating the drive assembly.

23. A pig launcher for use in a subsea location comprising:

a) a frame for coupling to a subsea production flowline;

b) a pig-launching magazine that is retrievable from the frame and adapted to hold a plurality of pigs, the magazine comprising:

a stab for landing in a receptacle on the frame;

a first tray having a plurality of staging chambers in a circular pattern, each of the chambers for holding a pig;

a second tray adjacent to the first tray, the second tray having a plurality of staging chambers in a circular pattern, each of the chambers of the second tray for holding a pig;

c) a drive assembly for sequentially releasing the pigs from the magazine, the drive assembly comprising:

a rotatably-driven shaft extending through the trays, the first tray being secured to the shaft for rotation to sequentially align each of the chambers of the first tray with a launching tube while the second tray remains stationary; and an indexer that selectively locks the second tray for rotation with the first tray after the first tray is empty of pigs to dispense the pigs from the second tray into the launching tube.

\* \* \* \* \*

UNITED STATES PATENT AND TRADEMARK OFFICE
CERTIFICATE OF CORRECTION

PATENT NO.   : 6,533,032 B1
DATED        : March 18, 2003
INVENTOR(S)  : Ricardo Moreira Seixas et al.

It is certified that error appears in the above-identified patent and that said Letters Patent is hereby corrected as shown below:

<u>Column 1,</u>
Line 45, after "assembly" insert a -- . -- (period) and delete "and receives power from."

Signed and Sealed this

Eighth Day of July, 2003

JAMES E. ROGAN
*Director of the United States Patent and Trademark Office*